United States Patent [19]

Arcaro

[11] Patent Number: 5,546,984
[45] Date of Patent: Aug. 20, 1996

[54] BELLOWS-TYPE, LOW SPILLAGE, QUICK DISCONNECT UNIT

[75] Inventor: David J. Arcaro, Boise, Id.

[73] Assignee: Hewlett-Packard Company, Palo Alto, Calif.

[21] Appl. No.: 259,772

[22] Filed: Jun. 14, 1994

[51] Int. Cl.[6] ............................................ F16L 37/28
[52] U.S. Cl. ........................ 137/614.03; 137/614
[58] Field of Search ................ 137/614.03, 614

[56] References Cited

U.S. PATENT DOCUMENTS

| 2,453,389 | 9/1948 | Thomas | 284/19 |
|---|---|---|---|
| 3,866,638 | 2/1975 | Mingus et al. | 137/614.03 |
| 4,445,539 | 5/1984 | Credle | 137/614.03 |
| 5,191,914 | 3/1993 | Gonzubz | 137/614 |
| 5,215,122 | 1/1993 | Rogers et al. | |

FOREIGN PATENT DOCUMENTS 1242202 10/1960 France.
1345304 10/1963 France.

*Primary Examiner*—A. Michael Chambers

[57] ABSTRACT

A quick disconnect male fitting joins to a female fitting that includes an outlet housing, an outlet opening, and a spring loaded plug that is biased against the outlet opening to seal the outlet opening. The male fitting comprises an inlet housing and a plunger having an expanded tip. A support fixedly mounts the plunger to the inlet housing. A bellows concentrically surrounds the plunger and extends from the inlet housing to the expanded tip of the plunger. The bellows has an engagement end which bears against the expanded tip, thereby sealing the interior of the bellows from the external environment. The bellows further is provided with a shoulder which, upon insertion of the plunger into the outlet opening, is compressed by engagement with the outlet housing, thereby causing compression of the bellows and separation of the engagement end from the expanded tip. This enables creation of a pathway from the outlet opening to the inlet housing and, to a connected printer.

8 Claims, 2 Drawing Sheets

DISCONNECTED

PRINTER SIDE ←→ CARTRIDGE SIDE

CONNECTED 5,546,984

BELLOWS-TYPE, LOW SPILLAGE, QUICK DISCONNECT UNIT

FIELD OF THE INVENTION

This invention relates to electrophotographic (EP) printers and, more particularly, to a quick disconnect that enables a user-replaceable liquid toner cartridge to be mated with an EP printer.

BACKGROUND OF THE INVENTION

To maintain costs as low as possible, EP printers are designed to allow as much user maintenance as possible. EP printers which employ liquid toners are provided with refillable toner reservoirs and require the user to replenish the in-printer reservoir from a liquid toner supply. The user is thus exposed to possible spillage, and, with color printers, a possibility that a wrong color toner may be loaded into a reservoir. To prevent such a possibility, EP printers are now designed to accommodate user-replaceable liquid toner cartridges. To accommodate such a replaceable toner cartridges, an interconnect must be provided that enables the cartridge to be easily and reliably replaced, while not allowing toner leakage that can escape beyond the confines of the printer and contaminate the user or his/her environment.

In FIG. 1, a prior art "low-spillage" quick disconnect is illustrated in a disconnected form. A male fitting 10 is integral to an inlet port of an EP printer and is adapted to receive liquid toner from a female fitting 12 which forms a portion of a liquid toner cartridge. Male fitting 10 comprises an inlet housing 14 which includes a hollow interior section 16 that communicates with a toner inlet to the printer (not shown). A plurality of struts 18 (only one is shown in FIG. 1) support a fixed plunger 20 which includes an inverted conical portion 22. An O-ring 24 is inset into the surface of inverted conical portion 22 and enables a sealing action between inverted conical portion 22 and a mating terminal end of a slidable sleeve 26. A further spring 28 seals the outer diameter of slidable sleeve 26 to housing 14. A spring 30 biases slidable sleeve 26 against an inwardly disposed ledge 32 of housing 14.

Female fitting 12 comprises an outer housing 34 which contains a slidable plug member 36. One end of slidable plug member 36 is sealed to housing 34 by an O-ring 38. A spring 40 biases slidable plug member 36 against a reduced internal diameter ledge 37 within housing 12 and provides a sealing action until slidable plug member 36 is moved rightwardly by action of male fitting 10. An inlet opening 42 communicates with the interior of a liquid toner cartridge and enables delivery of liquid toner into the interior of housing 34 and through outlet tube 44 within slidable plug member 36. When slidable plug member 36 is displaced to the right, outlet tube 44 is enabled to feed toner liquid through a left-most outlet orifice 46 in housing 34.

In FIG. 2, the configuration of male fitting 10 an female fitting 12 is illustrated after interconnection. It can be seen that, initially, inverted conical portion 22 of plunger 20 contacts the outermost portion of slidable plug 36 and begins to move it in a rightward direction, thereby compressing spring 40. At the same time, slidable sleeve 26 enters opening 46 in housing 34 and is stopped from further penetration thereinto by the interaction of a shoulder 47 on the exterior thereof with the edge of opening 46. As a result, slidable sleeve 26 is moved in a leftward direction, causing spring 30 to be compressed and opening a pathway for liquid toner to pass from tube 44 and into the interior of housing 14 (and from thence into a connected printer).

As can be seen from the above, the prior art low spillage quick disconnect mechanism includes many parts and plural sliding O-ring seals which can become contaminated with dried toner, etc. In such case, sliding sleeve 26 can become stuck in a "open" position thereby enabling toner to leak from male fitting 10.

Accordingly, it is an object of this invention to provide an improved low-spillage, quick disconnect fitting for providing liquid toner to an EP printer.

It is another object of this invention to provide a low-spillage quick disconnect fitting of reduced complexity.

It is another object of this invention to provide an improved low-spillage quick disconnect fitting which has an ability to tolerate misalignment of connector halves.

SUMMARY OF THE INVENTION

A quick disconnect male fitting joins to a female fitting that includes an outlet housing, an outlet opening, and a spring loaded plug that is biased against the outlet opening to seal the outlet opening. The male fitting comprises an inlet housing and a plunger having an expanded tip. A support fixedly mounts the plunger to the inlet housing. A bellows concentrically surrounds the plunger and extends from the inlet housing to the expanded tip of the plunger. The bellows has an engagement end which beats against the expanded tip, thereby sealing the interior of the bellows from the external environment. The bellows further is provided with a shoulder which, upon insertion of the plunger into the outlet opening, is engaged by the outlet housing, thereby causing compression of the bellows and separation of the engagement end from the expanded tip. This enables creation of a pathway from the outlet opening to the inlet housing and, to a connected printer.

DETAILED DESCRIPTION OF THE INVENTION

Figure 2:
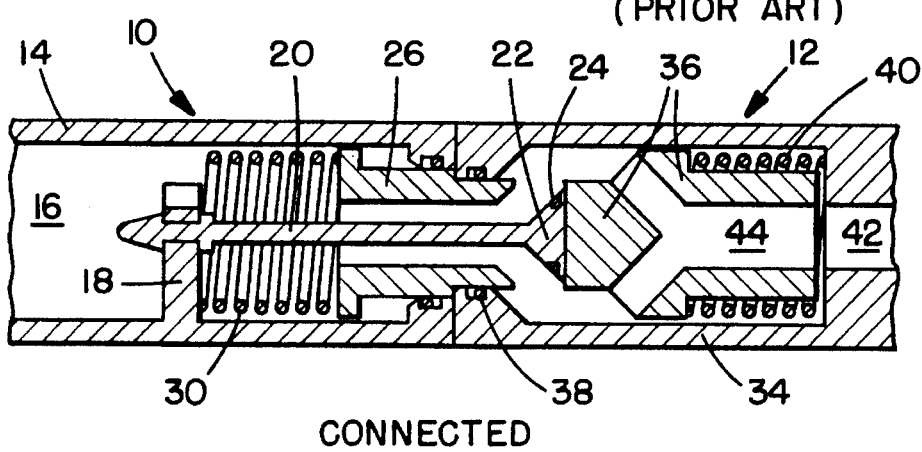
FIG. 2 is a side sectional view of the quick disconnect prior art fitting of FIG. 1 in the connected state.
Figure 4:
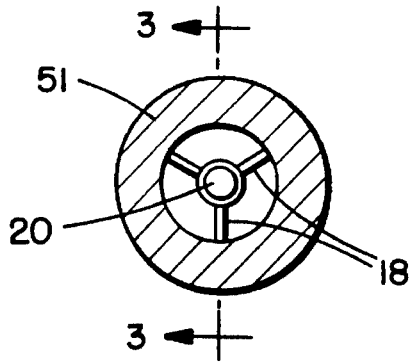
FIG. 4 is an end view of the fitting of FIG. 3.
Figure 3:
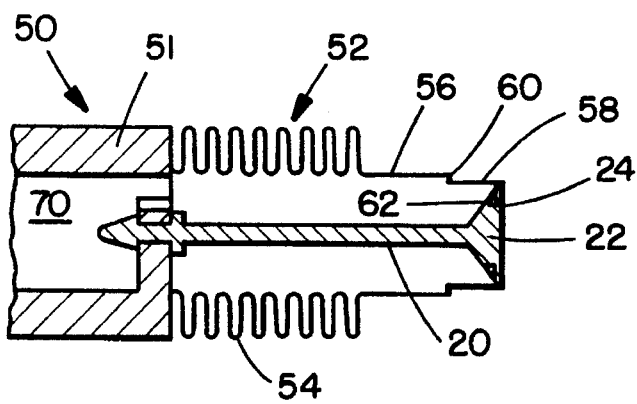
FIG. 3 is a side sectional view of a male fitting that mates with the female fitting of FIGS. 1 and 2, and is constructed in accordance with the invention hereof.

Referring to FIG. 3, a male connector 50 includes a housing 51 which extends from a printer and includes (as with FIGS. 1, 2) plural struts 18 (see also FIG. 4) which support fixed plunger 20 and inverted conical end 22. A hydroformed metal bellows 52 includes a bellows portion 54, and a connected cylindrical section 56. A lesser diameter cylindrical section 58 is connected to cylindrical section 56 via circumferential ledge 60. Reduced cylindrical section 58 includes inwardly bent surface 62 that bears against and compresses O-ring 24 in inverted conical end 22 to provide a seal thereto. When metal bellows 52 is as shown in FIG. 3, it is held in compression by inverted conical end 22 so that inwardly bent surface 62 accomplishes the sealing action.

Figure 1:
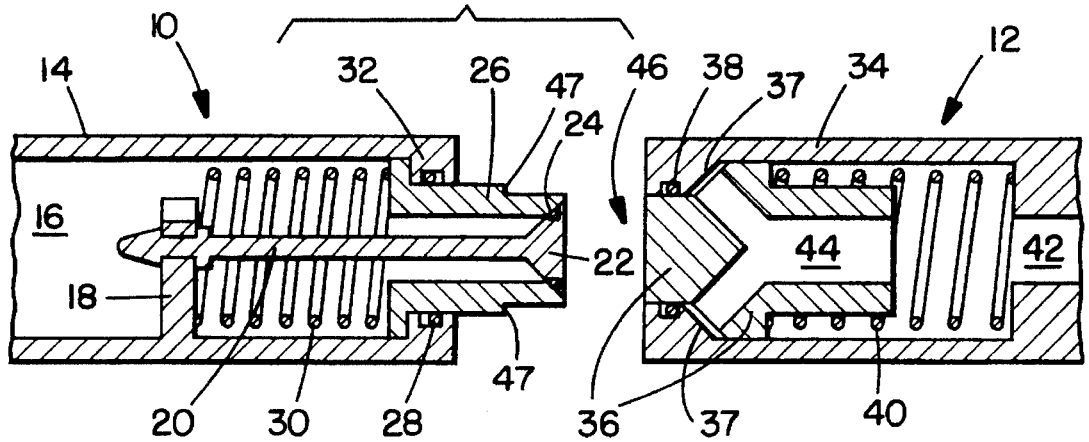
FIG. 1 is a side sectional view of a disconnected, quick disconnect male/female prior art fitting.

When male connector 50 is joined to female fitting 12 (see FIG. 1), inverted conical end 24 of plunger 20 acts in an identical manner as that above described for the arrangement of FIG. 1. However, as plunger 20 enters opening 46 in female fitting 12, ledge 60 contacts the inner edge of inlet 46. Continued rightward motion of the male fitting causes cylindrical section 56 to be displaced leftwardly, thereby compressing bellows 54. That action causes inwardly bent surface 62 to be removed from O-ring 24, thereby opening a pathway into the interior 70 of housing 50.

As a result of the above described action, a continuous pathway between tube 44 and interior 70 of the male connector 50 is established, thereby enabling liquid toner flow into a connected printer. Note that the structure of the male connector has been considerably simplified in that slidable sleeve 26, O-ring 28 and spring 30 have all been replaced by metal bellows 52. In addition, a sliding seal to O-ring 28 has been eliminated. Although there still is a sliding seal between cylindrical section 58 and O-ring 38, it is positioned on the liquid toner cartridge side of the connector. That portion 0f the connector is replaced when the toner cartridge is replaced and is continually/flushed with toner during printing operations. Further, the use of metal bellows 52 enables the interconnect mechanism to tolerate greater misalignment of the connector halves due to the intrinsic flexibility of bellows 54. Lastly, only one O-ring seal (i.e., O-ring seal 38) experiences toner pump pressure. As this seal is replaced on a regular basis with the toner cartridge, a higher reliability interconnect is provided.

Figure 5:
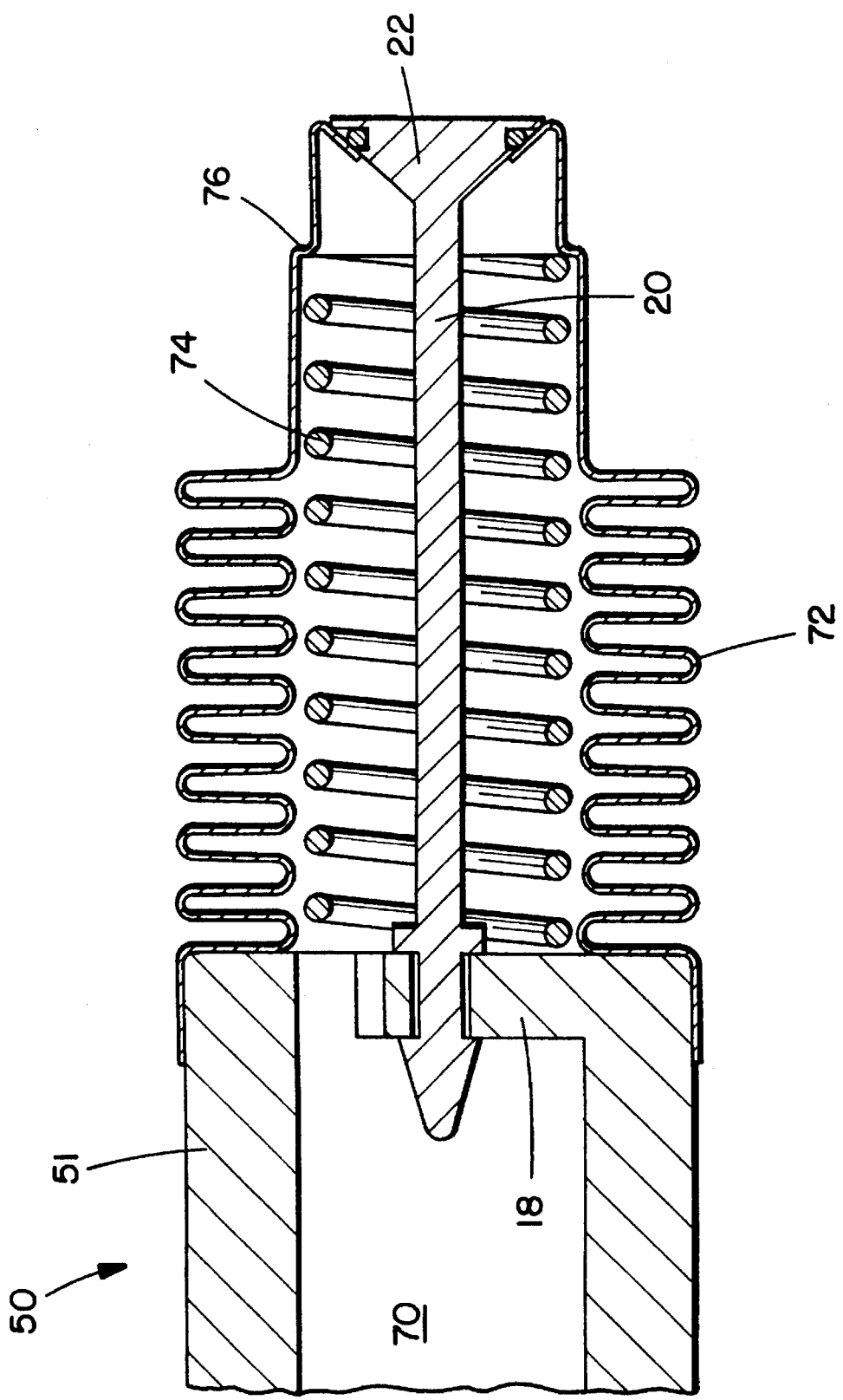
FIG. 5 is a sectional side view of a further embodiment of the invention.

In FIG. 5 a further embodiment of the male fitting of FIG. 3 is shown wherein metal bellows 52 has been replaced by a formed plastic bellows 72. To provide plastic bellows 72 with sufficient resiliency, a compression spring 74 is positioned interiorly to plastic bellows 72 and bears against struts 18 and the interior surface of circumferential ledge 76. In other respects, male connector 50 is identical to that shown in FIGS. 3 and 4 and operates similarly.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A quick disconnect fitting for joining to a female fitting that includes an outlet housing, an outlet opening and a spring loaded plug that is biased against said outlet opening so as to seal said outlet opening, said male fitting comprising:

an inlet housing;

a plunger having an expanded tip;

support means for fixedly-mounting said plunger to said inlet housing; and a bellows concentrically surrounding said plunger and extending from said inlet housing to said expanded tip so as to form a fluid pathway, said bellows having an engagement end which bears against said expanded tip and a shoulder which, upon insertion of said plunger into said outlet opening, engages said outlet housing and causes compression of said bellows and a separation of said engagement end of said bellows from said expanded tip, whereby said bellows forms a closed pathway into said inlet housing.

2. The quick disconnect fitting as recited in claim 1, wherein said outlet opening is provided with an encompassing ring seal member, and said bellows further comprises:

a first end that bears against and is sealed to said inlet housing and a second end that mates with a cylindrical portion which is sized to enter said outlet opening and to slidably engage said encompassing ring seal member, said cylindrical portion including said shoulder which bears against said outlet housing to compress said bellows when said expanded tip has moved said spring loaded plug from a sealing to an open position.

3. The quick disconnect fitting as recited in claim 2, wherein said expanded tip is cone-shaped, a bottom of the cone shape positioned away from said inlet housing, a top of the cone shape connected to an extended arm of said plunger and an inclined conical wall connecting said bottom to said top, said inclined conical wall including an encompassing seal member, said cylindrical portion of said bellows having an inwardly-shaped inclined surface that matches said shape of said inclined conical wall and bears against said encompassing seal member.

4. The quick disconnect fitting as recited in claim 3, wherein said inlet housing defines a cylindrical inlet with inwardly disposed struts, said struts supporting said plunger concentrically with respect to said cylindrical inlet.

5. The quick disconnect fitting as recited in claim 2, wherein said bellows means is comprised of a formed, flexible metal.

6. The quick disconnect fitting as recited in claim 2, wherein said bellows means is comprised of a formed plastic material.

7. The quick disconnect fitting as recited in claim 6 further including a compression spring positioned interiorly to said bellows for biasing said second end away from said inlet housing.

8. The quick disconnect fitting as recited in claim 1, wherein said inlet housing forms a portion of a printer and enables introduction of a liquid toner thereinto.

\* \* \* \* \*